United States Patent [19]

Baumann

[11] Patent Number: 5,516,079
[45] Date of Patent: May 14, 1996

[54] SMALL FLOW CONTROL VALVE WITH TIGHT SHUTOFF CAPABILITY

[76] Inventor: Hans D. Baumann, 32 Pine St., Rye, N.H. 03870

[21] Appl. No.: 380,003

[22] Filed: Jan. 27, 1995

[51] Int. Cl.$^6$ .......................... F16K 31/145; F16K 51/00
[52] U.S. Cl. .................. 251/61; 251/61.4; 137/454.5; 137/625.3
[58] Field of Search .................. 137/625.3, 454.5, 137/454.6, 454.2; 251/61, 61.4, 61.2

[56] References Cited

U.S. PATENT DOCUMENTS

| | | | |
|---|---|---|---|
| 2,065,087 | 12/1936 | May | 137/454.5 |
| 2,963,038 | 12/1960 | Sharp | 137/454.6 |
| 3,187,775 | 6/1965 | Pinnell | 137/625.3 |
| 3,672,629 | 6/1972 | Sorteberg | 251/61.2 |

FOREIGN PATENT DOCUMENTS 20633  4/1968  Japan ..................................... 251/61.4

OTHER PUBLICATIONS

"Series 240 Sumson Micro–Trim", Samson Controls, Inc., Ontario, Canada, Oct. 1991.

*Primary Examiner*—A. Michael Chambers

[57] ABSTRACT

Small flow control valve with tight shutoff capability having a conventional valve housing with inlet and outlet ports and a one piece internal guide and seat ring combination, further having a plug with a lower throttling profile engaged within the seat ring bore; a deformable seal which is capable of being deformed by a collar radially inwardly to compress the exterior of the lower contoured plug portion to prevent leakage in the closed valve position. The collar is held in constant compression by a coiled spring placed between the collar and an enlarged head portion of the plug. The valve further has an actuating device adjustably attached thereto.

6 Claims, 1 Drawing Sheet

SMALL FLOW CONTROL VALVE WITH TIGHT SHUTOFF CAPABILITY

BACKGROUND OF THE INVENTION

My invention relates to automatic control valves operated either by a modulating electric or pneumatic signal to control very minute flow rates, as is customary in the operation of pilot plants in the chemical or petroleum industry. Control valves presently in use for this purpose are either of the low-lift variety utilizing a needle-type plug or the long lift cylindrical plug type with precision machined longitudinal scratch, commonly referred to as micro-splined plugs. Both of these types exhibit some problems. The needle-type plug is commonly limited to a tapered angle of 30° to avoid self-locking against the seat ring bore. This in turn reduces the stroke whenever small orifice sizes are required. For example, the maximum usable stroke for control with a 1/32 inch orifice is only 0.055 inch, i.e., much too short to achieve any meaningful positioning accuracy with conventional actuating devices. Another drawback is the very high tendency for fluids to cavitate with needle plugs resulting in early destruction of the valve parts.

The micro-splined plugs require extremely accurate machining of splined grooves having depths of less than 0.001 inch. The minimum controllable area, limiting the lowest flow rate that can be regulated, is given by the radial clearance between the external diameter of the plug and the orifice bore. With a normal radial clearance of 0.00025 inch, the minimum controllable area of such a plug with 1/4 inch diameter is $2 \times 10^{-4}$ in$^2$ or 25% of the maximum area of 1/32 inch dia. orifice, thereby limiting the ratio of max. to min. control area or rangeability to less than 4:1.

My invention, on the other hand, reduces the amount of radial clearance around the valve plug to virtually zero by the use of a spring-loaded and deformable plastic seat ring that is squeezed around the plug in the closed or nearly closed valve position. This is a major improvement over my prior invention shown in U.S. Pat. No. 3,997,141, which had no soft seat and, thereby, no tight shutoff capability.

The latter feature is important when extremely small flow rates of gaseous media need to be controlled. For example, the leak rate of 1/4" diameter needle trim with metal-to-metal may well exceed 10 cc/min at 100 psi pressure drop of which is well within the control range of many small flow valve applications.

To obtain tight shutoff of valves handling high pressure of 1000 psi or more has always been a challenge to a valve designer. One successful way of doing this is illustrated in my prior U.S. Pat. No. 3,809,362. Here, following metal-to-metal contact of a plug with a moveable seal, a plastic such as PTFE is compressed at a very high rate of pressure so that the plastic begins to flow, thereby, providing a highly viscous sealing media between the fluid pressure and the valve outlet. While this solution is very effective, it cannot be scaled down to plug sizes smaller than about 1/2" diameter.

A solution to find a workable alternative to such a trim mechanism is given in my present invention where a variable spring load is able to highly compress an annular PTFE (or similar plastic) insert as explained in more detail in the following description.

To have a spring opposed valve plug in itself is not a new art. For example, publication 8015-3 of Samson AG of West Germany does show such a plug where the spring serves to retract a needle plug from a separate seat ring which is retained within a housing by a seat nut. This poses various serious disadvantages: First, serious alignment problems can occur whenever the seat ring bore is not machined together with the plug guide realizing that the clearance between plug and seat bore may be as low as 0.0002"; secondly, any contact between the seat ring and the housing can cause an additional leakage path for the process fluid.

My invention overcomes these limitations in as much as my plug guide diameter and seat bore are machined simultaneously and within the same part. This also eliminates the potential leak path mentioned above.

Finally, by choosing a spring with a variable spring rate, I can limit the spring force to a moderate load during normal valve travel and to generate a high load (for deformation of the PTFE ring) near the point of valve closure. This reduces friction on the valve plug during normal operation.

Another way to obtain high rangeability or a low minimal controllable flow coefficient is to have a long frictional flow path between plug diameter and seat ring bore. This means a relatively long plug travel exercised by a pneumatic piston actuator who's precision in positioning the valve plug is enhanced by an attached valve positioner. Both actuator and positioner should be as compact as possible. To this end, I have devised a way to conduct air from the positioner to the pressurized cylinder of the actuator without need for an external air tubing, and I have, furthermore, found a way to adjust the initial travel position or zero setting of the actuator without resorting to penetrating levers or adjustment screws prone to leak and to add significant cost to the valve.

DESCRIPTION OF THE INVENTION

Figure 1:
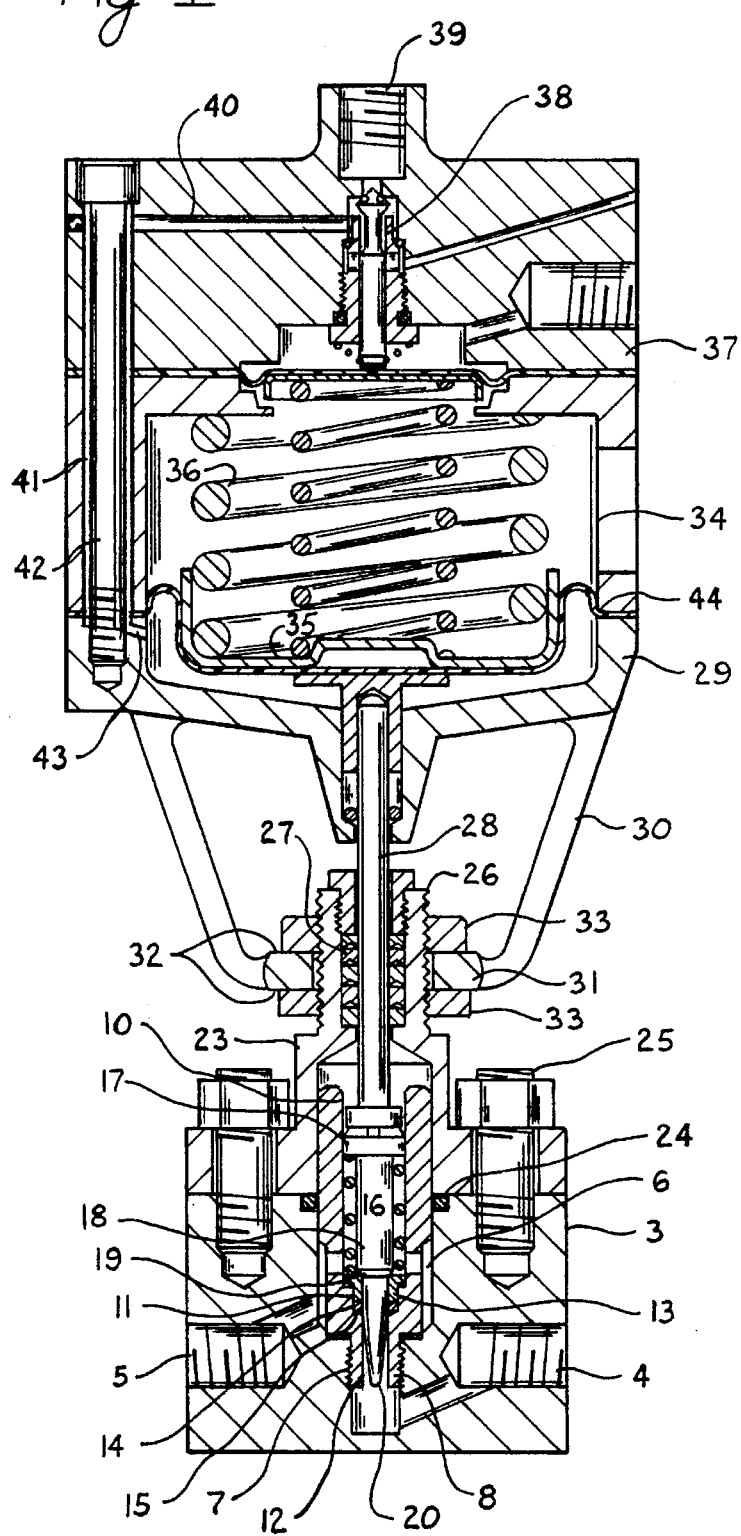
FIG. 1 is a centered cross-sectional view of the invention with a plug having a parabolic contour and is shown in the closed position.

Referring back to FIG. 1, my invention is comprised of housing 3 having a threaded inlet port 4 and a similar outlet port 5 capable of connecting fluid in a piping system. Housing 3, furthermore, has a vertical passage 6 with a smaller threaded extension 7. This threaded portion retains an orifice member 8 having a central, step-down passage which has an enlarged guide diameter 10, a step-down diameter portion 11, and a lower seat ring bore 12. A collar 13 is fitted with a smaller clearance to slide within the step-down diameter portion 11, a seal ring 14 made from a deformable material, such as PTFE, is placed between collar 13, and the terminating shoulder 15 of step-down diameter portion 11. A cylindrical valve plug 16 with an enlarged head portion 17 is fitted with close clearance in the upper guide bore 10. This plug, furthermore, has a reduced diameter mid-section 18 terminating in a seating portion 19 and a further reduced fluid controlling portion 20. In the closed valve position, the upper diameter part of the fluid controlling portion 20 is in close diametrical contact with the bore of collar 13 and seal ring 14, and finally the seat ring bore 12. The seating portion 19 is designed to be able to compress the upper portion of collar 13 and, therefore, compress seal ring 14. This will force seal ring 14 to reduce its diameter until firm contact with the upper exterior diameter of the lower fluid controlling portion 20 is achieved to prevent leakage from the high pressure of inlet port 4 to the low pressure of outlet port 5.

Figure 2:
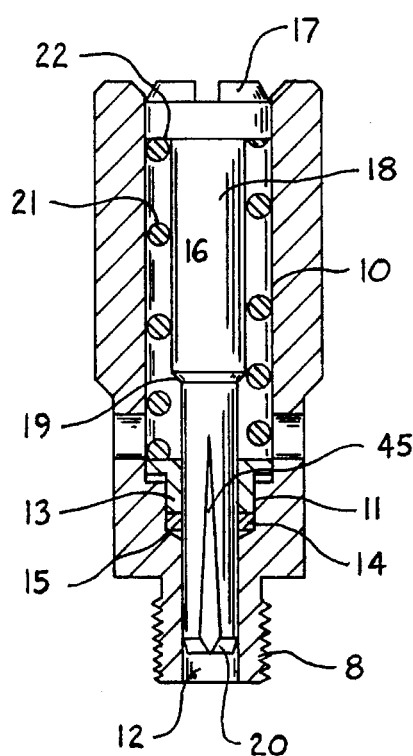
FIG. 2 shows an enlarged cross-sectional view of the central portion of my invention including a valve plug having a V-notched plug being in the open position.

During normal opening of the valve, valve plug 16 is in the upper position as shown in FIG. 2. Here a coiled compression spring 21 will exert a force on collar 13 and, therefore, seal ring 14 by being compressed by shoulder 22 of the guiding head portion 17. This is not sufficient for shut off, but enough to maintain close contact between seal ring 14 and fluid controlling portion 20 in order to prevent clearance flow between plug and seal ring in the low lift position.

In a more refined version, the coils of compression spring 21 are unevenly spaced. This will allow for a lower spring rate that is pounds per length of compression when the valve is wide open (and thereby reduces the pressure on seal ring 14), but the further down movement of the plug will cause the more closely spaced coils to touch each other and, therefore, reduce the number of active remaining coils. This will have the effect of greatly increasing the spring rate and, therefore, the load and compression stress within seal ring 14, which is desired to reduce undesired clearance flow as mentioned above. To close the vertical body passage 6, I employ a bonnet 23 which is sealed against the housing via suitable gasket means 24 compressed by a number of studs 25.

Bonnet 23 has an upper threaded portion 26 containing therein a valve packing 27 and a valve stem 28. An actuating device 29 having a lower yoke portion 30 slidingly engages the threaded portion 26 with the bored lower extension 31 having two flattened surfaces 32. Extension 31 is spaced and retained by two nuts 33. Actuator device 29, furthermore, has a cylinder bore 34 containing therein a piston 35 which can be motivated upward by compressed air overcoming the force of a return spring 36. On top of cylinder bore 34 there is a positioning device 37 having within a 3-Way valve 38 which is capable of producing an air signal from compressed air supplied to port 39. This signal is fed via horizontal port 40 into one or more bolt holes 41 being sufficiently larger than one or more bolts 42 contained therein and able to compress both the positioning device 37 and cylinder bore 34 onto lower yoke portion 30. Thus, the air signal being generated by 3-Way valve 38 can pass via port 40 and bolt hole 41 and a bleed hole 43 into the lower cavity below piston 35, which is sealed by a rolling diaphragm 44 and is now capable of moving up by compressing spring 36. This will allow stem 28 to travel upwards motivated by the compression force of spring 21 and the fluid pressure acting on the cross-sectional area orifice 12, thereby allowing plug 16 to move up and allowing fluid to pass through the cross-section area of a splined exterior groove 45 past seal ring 14 and into outlet port 5. In the configuration shown in FIG. 1, fluid controlling portion 20 has a parabolic shape which is suitable for the more larger flow capacities utilized with my invention.

While the present invention has been described in a preferred embodiment, nothing should distract from the scope of my attached claims by making numerous mortifications. For example, suitable means could be added to the orifice member of my invention to prevent collar 13 from being pushed out of step-down diameter portion 11 in case sudden high fluid pressures are encountered that could overpower the force of spring 21. Instead of being bolted to housing 3, bonnet 23 can just as well be threadingly engaged to housing 3, and instead of valve stem 28 being detachable from plug 16, both could be permanently interconnected if so desired.

Having thus described what is new and what constitutes my invention, I hereby claim the following:

1. Small flow control valve with tight shutoff capability, comprising a) a housing having fluid connecting inlet and outlet ports, and a vertical passage interconnecting said inlet and outlet ports;

b) an orifice member suitably retained within said central vertical passage of said housing and having a central longitudinal bore with an enlarged upper guide diameter, a stepped down diameter portion, and a smaller lower seat ring bore;

c) a collar having an exterior dimension which slidingly engages the stepped-down diameter portion and a central bore being identical to the smaller lower seat ring bore of said orifice member;

d) a seal ring made of a deformable material being retained within said stepped-down diameter portion and above the seat ring portion of said orifice member, and furthermore, being able to be compressed by said collar;

e) a generally cylindrical valve plug having an upper head portion slidingly engaging the enlarged upper guide diameter of said orifice member, a reduced diameter midsection terminating in a seating portion, and a further reduced fluid controlling portion slidingly engaging said collar, seal ring, and seat ring bore and where the seating portion is capable of compressing said collar and said seal ring;

f) means to retain and compress the collar within said orifice member;

g) a bonnet serving as closure means for the housing and having an upper threaded portion, and retaining within a sliding valve stem capable of exerting a downward force onto said valve plug;

h) valve actuating means with a lower yoke portion, the latter having a cylindrical opening and an upper and a lower flattened surface slidingly engaging the threaded bonnet portion.

2. Small flow control valve with tight shutoff capability as described in claim 1, wherein said means to compress said collar is a compression spring interspaced between the upper head portion of said plug and the collar.

3. Small flow control valve with tight shutoff capability as described in claim 2, wherein said compression spring has unequally spaced windings whereby the generated load can vary depending on the degree of compression.

4. Small flow control valve with tight shutoff capability as described in claim 1, wherein a substantial distance in length of said reduced fluid controlling portion of said valve plug has a splined exterior groove.

5. Small flow control valve with tight shutoff capability as described in claim 1, wherein said actuating means communicates with said valve stem and wherein said threaded bonnet portion has two nuts straddling the lower yoke portion of the actuator and engaging the upper and lower flattened surfaces and whereby the distance between the valve actuating means and the housing can be adjusted by a change in the location of the two nuts engaging said threaded bonnet portion.

6. Small flow control valve with tight shutoff capability as described in claim 1, wherein said valve actuating means comprises a cylinder having internal piston means capable of producing a force in proportion to a given air signal, said cylinder being mounted on top of said lower yoke, a positioning apparatus capable of creating a compressed air signal and mounted next to said cylinder, and whereby said positioning apparatus and the cylinder are fastened together to said yoke by suitable bolts extending through somewhat enlarged bolt holes passing both through the positioning apparatus and said cylinder and capable of transmitting said compressed air signal from the former to the latter.

* * * * *